Jan. 7, 1941. J. LEDERFINE 2,228,058
HARMONICHORD INSTRUMENT
Filed Nov. 7, 1939 3 Sheets-Sheet 1

INVENTOR
Joseph Lederfine
BY
ATTORNEY

Jan. 7, 1941. J. LEDERFINE 2,228,058
HARMONICHORD INSTRUMENT
Filed Nov. 7, 1939  3 Sheets-Sheet 2

INVENTOR
Joseph Lederfine
BY
ATTORNEY

Jan. 7, 1941.  J. LEDERFINE  2,228,058
HARMONICHORD INSTRUMENT
Filed Nov. 7, 1939   3 Sheets-Sheet 3

INVENTOR
Joseph Lederfine
BY
ATTORNEY

Patented Jan. 7, 1941

2,228,058

UNITED STATES PATENT OFFICE 2,228,058

HARMONICHORD INSTRUMENT

Joseph Lederfine, Brooklyn, N. Y.

Application November 7, 1939, Serial No. 303,203

7 Claims. (Cl. 84—378)

This invention relates to new and useful improvements in a harmonica chord instrument.

The invention has for an object the construction of an instrument as mentioned which is characterized by a hollow air flow body having an air inlet and an open side, a reed plate mounted across the open side, and a tonal chamber body mounted on said body over the reed plate and having its chambers controlled with key operated valves.

Still further the invention proposes the arrangement of the valves in such a manner that they selectively control the passage of air from each tonal chamber, operable manually by manipulation of individual keys projecting from the instrument.

Still further the invention proposes to so arrange the hollow air flow body that the air inlet comprises a mouthpiece through which air may be supplied therein, and so that this mouthpiece may be located at any side of the hollow body.

Still further the invention contemplates the provision of an octave shutter, in a modified form of the invention, to control the octaves of the instrument.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
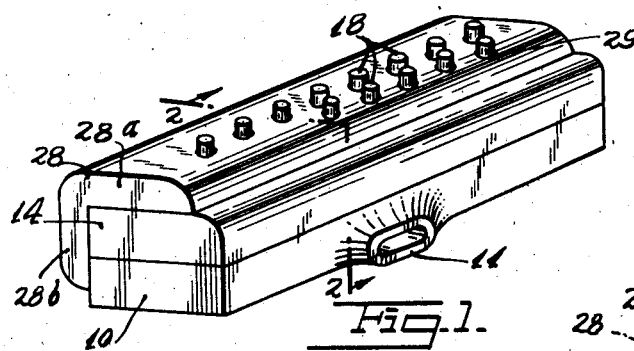
Fig. 1 is a perspective view of a harmonica chord instrument constructed in accordance with this invention.
Figure 2:
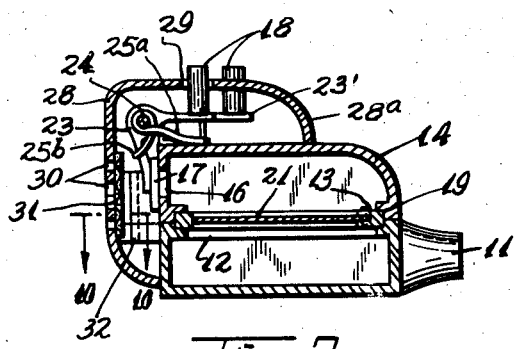
Fig. 2 is a vertical sectional view taken on the line 2—2 of Fig. 1.
Figure 3:
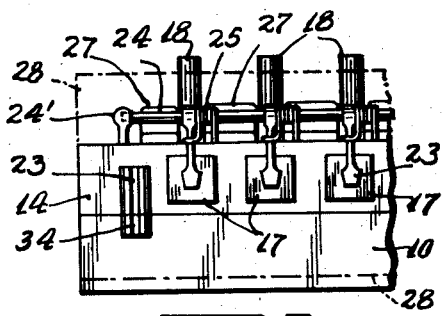
Fig. 3 is a fragmentary elevational view looking from the left of Fig. 2, but illustrated with the casing removed.
Figures 4, 11:
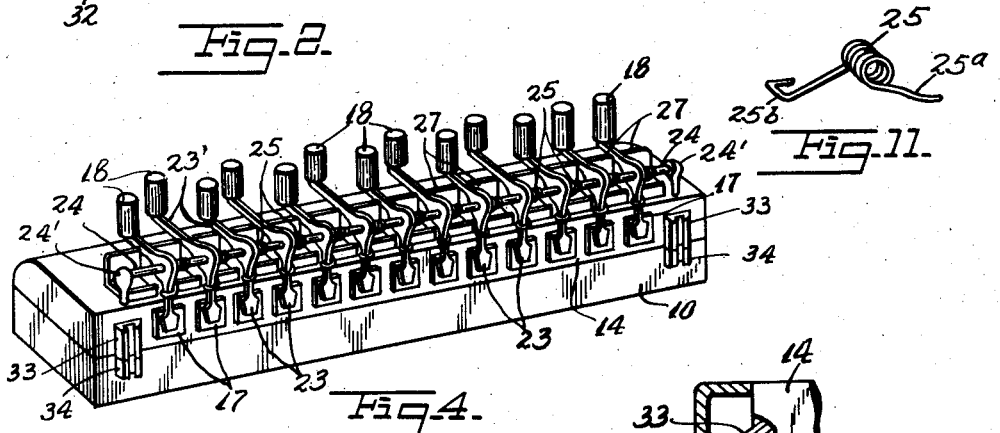
Fig. 4 is a perspective view of the instrument illustrated with the casing removed.
Fig. 11 is a perspective view of one of the springs used in the instrument.
Figure 8:
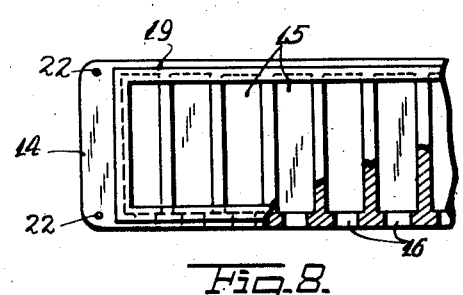
Fig. 8 is a fragmentary elevational view of Fig. 7 with certain portions broken away to disclose interior parts.
Figure 10:
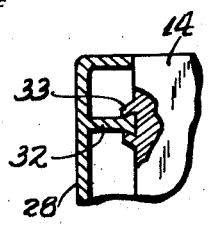
Fig. 10 is a fragmentary horizontal sectional view taken on the line 10—10 of Fig. 2.

The harmonica chord instrument, according to this invention, includes a hollow air flow body 10 having an air inlet 11 and an open side 12. A reed plate 13 is mounted across said open side. A tonal chamber body 14 is mounted on the body 10 and over the reed plate 13 and has a plurality of tonal chambers 15 connecting with the hollow body 10 through the reed plate 13. Each tonal chamber 15 has an air outlet 16. A valve 17 is engaged over each outlet 16. These valves are connected with depressible keys 18 by which they may be operated.

The adjacent faces of the bodies 10 and 14 are formed with recesses 19 for accommodating the reed plate 13. The air inlet 11 of the hollow air flow body 10 may be at any location along the sides of the body, depending merely on taste. The inlet 11 is so fashioned that it may be engaged in one's mouth and act as a mouthpiece for playing the instrument.

Figure 9:
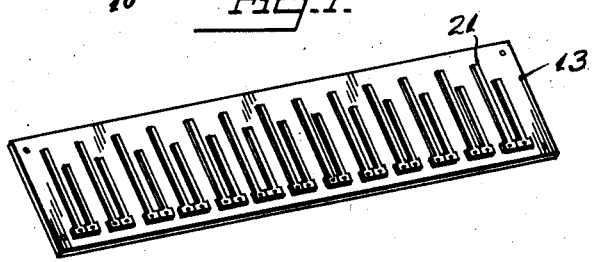
Fig. 9 is a perspective view of the reed plate, per se.
Figure 13:
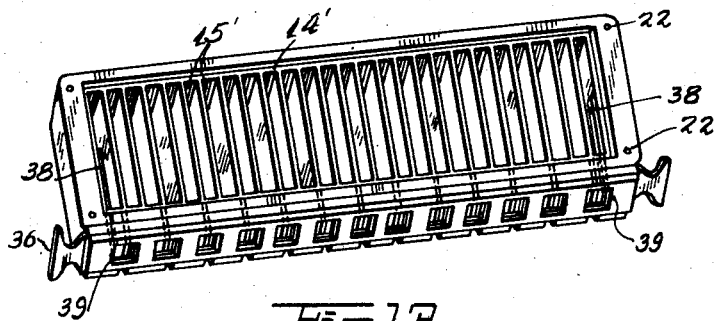
Fig. 13 is a perspective view of the tonal chamber body of the instrument illustrated in Fig. 12, but illustrated bottom side up.
Figure 14:
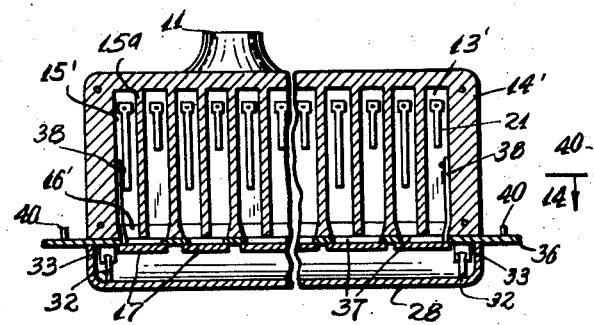
Fig. 14 is a horizontal sectional view of the harmonica chord instrument illustrated in Figs. 12 and 13, this view being as though taken on the line 14—14 of Fig. 12.
Figure 12:
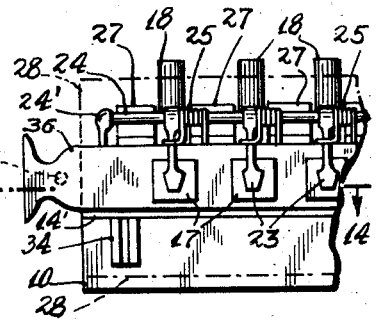
Fig. 12 is a fragmentary elevational view similar to Fig. 3 but illustrating a modified form of the device.
Figure 15:
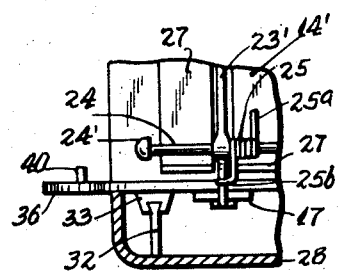
Fig. 15 is a fragmentary plan view of Fig. 12 to which a sectional view of the casing has been added.

The reed plate 13 is illustrated in detail in Fig. 9. It should be noted that it comprises the usual plate formed with the usual openings over which the reeds 21 are mounted. These reeds are arranged in groups of two notes one octave apart. Preferably, there are 13 sets of notes covering the notes C, D, E, C♯, F, D♯, G, F♯, A, G♯, B, A♯ and C. The keys 18 are arranged in two rows, one row for controlling the sharp notes and the other for controlling the naturals. The tonal chamber body 14 has 13 tonal chambers 15, one for each of the 13 sets of notes. At the corners the bodies 10 and 14 are formed with openings 22 through which fastening elements such as bolts and nuts or screws are engaged to hold these parts together.

Each valve 17 is mounted on a valve rod 23 which extends upwards and is supported by a rod 24. This latter rod is mounted at its ends on rod supporters 24' mounted on the top of the tonal chamber body 14. Each rod 23 continues into a lever portion 23'. The keys 18 are mounted on the ends of these lever portions 23'. For each rod 23 there is a spring 25. These springs are coaxially mounted on the rod 24 and have one of their ends 25a engaging a stationary part of the instrument and their other ends formed with hook portions 25b hooked over the rod 23. The springs 25 act to urge the valves 17 closed. The arrangement is such that when the keys 18 are depressed, the rods 23 will pivot to open the valves. Lever aligning plates 27 are mounted on the top of the tonal chamber body 14 for holding the lever portions 23' in relatively longitudinal fixed positions on the rod 24. The lever portions 23' engage in between the adjacent edges of the lever aligner plates 27 and so the lever portion 23' and rods 23 are held from shifting on the rod 24.

Figure 5:
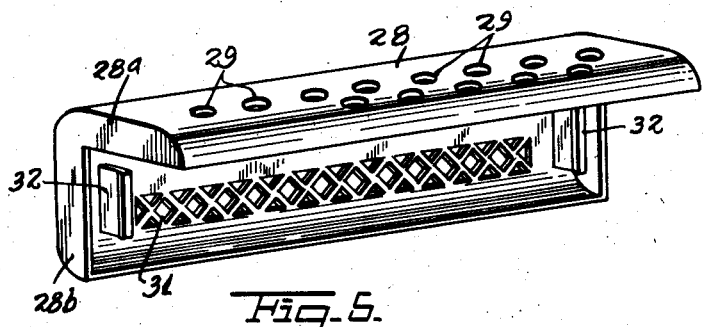
Fig. 5 is a perspective view of the casing, per se.
Figure 6:
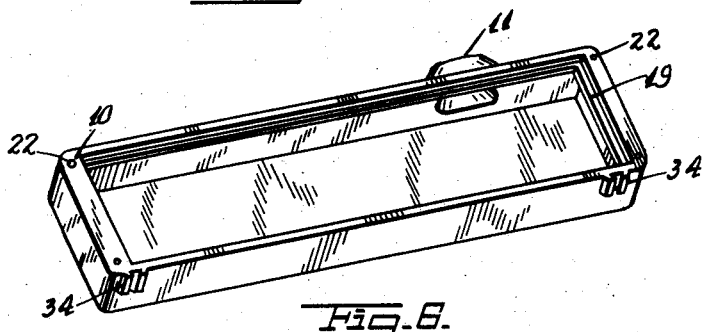
Fig. 6 is a perspective view of the hollow air flow body per se.
Figure 7:
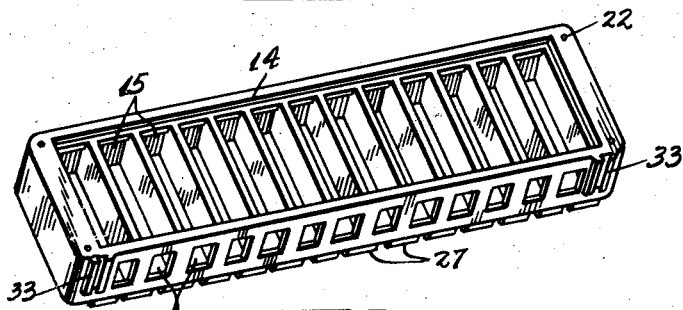
Fig. 7 is a perspective view of the tonal chamber body illustrated with the bottom side up.

A casing 28 engages over the rear and top portions of the hollow bodies 10 and 14. This casing has a top portion 28a engaging over the top of the body 14 and encasing the valves, and the valve rods and adjacent parts. The top portion 28a is provided with openings 29 through which the keys 18 project. The casing 28 also has a rear portion 28b which extends down the back of the bodies 14 and 10. This rear portion is provided with a plurality of openings 30 in the form of a grille (see Fig. 5). These openings 30 are covered with porous material 31 through which the sound may pass.

A means is provided for mounting the casing 28 in position and this means includes a pair of triangular shaped projecting tongue portions 32 engaging into complementary receiving groove portions 33 and 34 formed in alignment with each other, on the rear portions of the bodies 14 and 10. The arrangement is such that the casing 28 may be forced upwards to disengage the portions 32 from the portions 33 and 34, when the casing 28 is removed.

The operation of the device is as follows:

The person playing the instrument blows into the mouthpiece 11 and then depresses the keys 18 according to the notes desired to be played. For each key 18 depressed, one of the valves 17 will open. Air from the airflow body 10 may now pass up through the reed plate 13 and into the particular tonal chambers 15 opened by the valves 17 operated by the keys 18. This passage of air sounds the particular notes. In this manner a tune may be played. When the keys 18 are released the valves 17 automatically close under the actions of the springs 25.

In Figs. 12 to 15 inclusive a modified form of the invention has been disclosed which distinguishes from the prior form in the provision of an octave shutter 36 slidably mounted on the tonal chamber body 14' and arranged to control the octave of the instrument. This shutter 36 is slidably supported across the outlets 16' of the tonal chambers 15'. Each of the tonal chambers 15' encircle adjacent reeds on the reed plate for similar notes one octave apart, and are each divided by a partition 15a into two sections, one section for each of the similar pairs of the reed plate. The octave shutter 36 is formed with openings 37 which in the normal position of the shutter align with the outlets 16'. Leaf springs 38 are mounted upon certain of the walls of certain of the tonal chambers and have their outer ends engaging small recesses 39 formed in the sides of certain of the openings 37. These springs 38 act to keep the octave shutter in its normal position. The valves 17 function by engaging over the openings 37 to control the tonal chambers. The shutter 36 is provided with projecting stops 40 adapted to strike stationary portions of the instrument to limit motion of the shutter in one direction and the other. The tonal chamber body 14' distinguishes from the body 14 merely in the addition of the partitions 15a in each of the octave chambers so that there are twice as many sub-chambers to accommodate all of the 10 reeds of the reed plate. In other respects this form of the invention is similar to the previous form and like parts may be identified by like reference numerals.

The operation of this form of the invention is as follows:

When the octave shutter 36 is free the springs 38 hold it in the normal position in which the openings 37 are aligned with the outlets 16' of the tonal chambers. The instrument may now be played and will play exactly as the instrument disclosed in the prior form of the invention. However, the octave chord effect of the instrument may be changed by moving the shutter 36 in one direction or the other. When it is so moved the openings 37 will move out of alignment with the tonal chambers controlling one of the sets of octave notes of the reeds of the reed plate. When moved in one direction, it will move out of alignment with the sub-chambers controlling one octave of notes. In this way the instrument may be played with the octave shutter in either position to play the tone in a different octave.

The operation of this form of the invention is identical to the previous form, distinguishing only in the operation of the valve shutter.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a harmonica chord instrument, a tonal chamber body having a flat top wall and a rear wall at right angles thereto, said rear wall having a plurality of air outlets, a valve for closing each of said air outlets, a casing enclosing said valves, and a key extending from each of said valves through a complementary opening formed in said casing, each of said valves, comprising an L-shaped valve rod, a valve plate mounted on the free end of one of the arms of said valve rod and engaging over said air outlet, said key being mounted on the free end of the other of the arms of said valve rod, means at the junction of said arms for pivotally supporting said valve rod, and resilient means for urging said valve rod into a position in which said valve plate will close said air outlet.

2. In a harmonica chord instrument, a tonal chamber body having a flat top wall and a rear wall at right angles thereto, said rear wall having a plurality of air outlets, a valve for closing each of said air outlets, a casing enclosing said valves, and a key extending from each of said valves through a complementary opening formed in said casing, each of said valves, comprising an L-shaped valve rod, a valve plate mounted on the free end of one of the arms of said valve rod and engaging over said air outlet, said key being mounted on the free end of the other of the arms of said valve rod, means at the junction of said arms for pivotally supporting said valve rod, and resilient means for urging said valve rod into a position in which said valve plate will close said air outlet, said first-mentioned means comprising a pair of spaced brackets mounted on said flat top wall, a rod mounted between said brackets at right angles to said valve rods, each of said valve rods having the junction of its arms pivotally mounted on said rod.

3. In a harmonica chord instrument, a tonal chamber body having a flat top wall and a rear wall at right angles thereto, said rear wall having a plurality of air outlets, a valve for closing each of said air outlets, a casing enclosing said valves, and a key extending from each of said valves through a complementary opening formed in said casing, each of said valves, comprising an L-shaped valve rod, a valve plate mounted on the free end of one of the arms of said valve rod and engaging over said air outlet, said key being mounted on the free end of the other of the arms of said valve rod, means at the junction of said arms for pivotally supporting said valve rod, and resilient means for urging said valve rod into a position in which said valve plate will close said air outlet, said first-mentioned means comprising a pair of spaced brackets mounted on said flat top wall, a rod mounted between said brackets at right angles to said valve rods, each of said valve rods having the junction of its arms pivotally mounted on said rod, said latter-mentioned means comprising a spring for each of said valve rods coaxially wound on said rod, each of said springs having one of their ends engaging one of the arms of said valve rods, and each of said springs having the other of their arms engaging said flat top wall.

4. In a harmonica chord instrument, a tonal chamber body having a flat top wall and a rear wall at right angles thereto, said rear wall having a plurality of air outlets, a valve for closing each of said air outlets, a casing enclosing said valves, and a key extending from each of said valves through a complementary opening formed in said casing, each of said valves, comprising an L-shaped valve rod, a valve plate mounted on the free end of one of the arms of said valve rod and engaging over said air outlet, said key being mounted on the free end of the other of the arms of said valve rod, means at the junction of said arms for pivotally supporting said valve rod, and resilient means for urging said valve rod into a position in which said valve plate will close said air outlet, said first-mentioned means comprising a pair of spaced brackets mounted on said flat top wall, a rod mounted between said brackets at right angles to said valve rods, each of said valve rods having the junction of its arms pivotally mounted on said rod, and means for holding each of said valve rods from sliding along the length of said rod.

5. In a harmonica chord instrument, a tonal chamber body having a flat top wall and a rear wall at right angles thereto, said rear wall having a plurality of air outlets, a valve for closing each of said air outlets, a casing enclosing said valves, and a key extending from each of said valves through a complementary opening formed in said casing, each of said valves, comprising an L-shaped valve rod, a valve plate mounted on the free end of one of the arms of said valve rod and engaging over said air outlet, said key being mounted on the free end of the other of the arms of said valve rod, means at the junction of said arms for pivotally supporting said valve rod, and resilient means for urging said valve rod into a position in which said valve plate will close said air outlet, said first-mentioned means comprising a pair of spaced brackets mounted on said flat top wall, a rod mounted between said brackets at right angles to said valve rods, each of said valve rods having the junction of its arms pivotally mounted on said rod, and means for holding each of said valve rods from sliding along the length of said rod, comprising a plate extending upwards from said flat top wall, said plate being formed with a plurality of slots extending downwards from its top edge, each of said valve rods having one of its arms engaging one of said slots for holding said valve rods against shifting along the length of said rod.

6. In a harmonica chord instrument, a tonal chamber body having a flat top wall and a rear wall at right angles thereto, said rear wall having a plurality of air outlets, a valve for closing each of said air outlets, a casing enclosing said valves, and a key extending vertically upwards from each of said valves through a complementary opening formed in said casing, said casing being vertically removably mounted on the rear wall, whereby said casing may be removed by lifting the same vertically upwards for exposing said valves when desired.

7. In a harmonica chord instrument, a tonal chamber body having a flat top wall and a rear wall at right angles thereto, said rear wall having a plurality of air outlets, a valve for closing each of said air outlets, a casing enclosing said valves, and a key extending vertically upwards from each of said valves through a complementary opening formed in said casing, said casing being vertically removably mounted on the rear wall, whereby said casing may be removed by lifting the same vertically upwards for exposing said valves when desired, said removable mounting, comprising vertically extending dove-tailed tongue elements formed on one of said parts and slidably engaging complementary vertically extending dove-tailed receiving grooves formed on the other of said parts.

JOSEPH LEDERFINE.